Patented Oct. 21, 1941

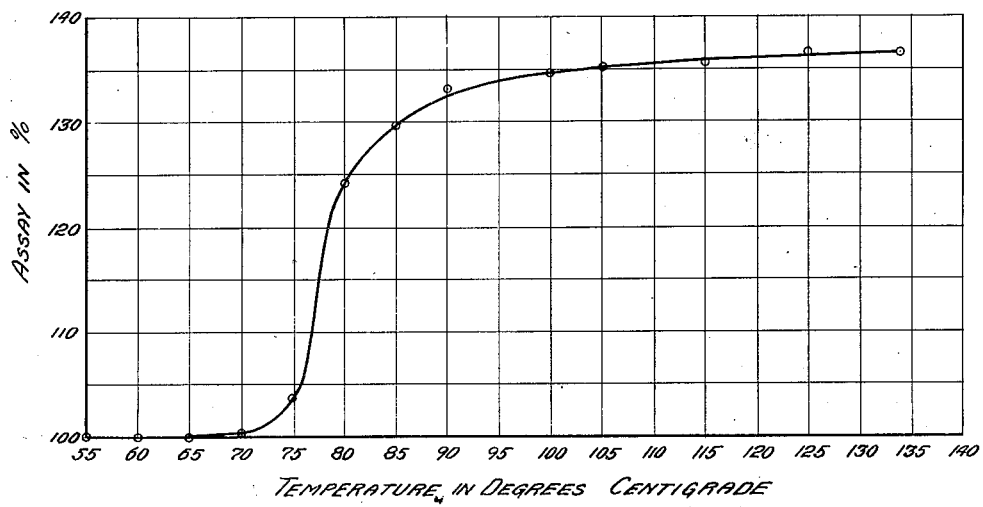

UNITED STATES PATENT OFFICE 2,260,004

STABLE SOLUBLE MAGNESIUM ACID CITRATE

John L. Davenport and Charles F. De Costa, Kew Gardens, N. Y., assignors to Charles Pfizer & Company, Brooklyn, N. Y., a corporation of New Jersey Application November 3, 1939, Serial No. 302,714

5 Claims. (Cl. 260—535)

This invention relates to a new and useful form of magnesium acid citrate which will remain soluble for an indefinite period of time; in other words, stable magnesium acid citrate.

The pentahydrate of magnesium acid citrate ($MgHC_6H_5O_7.5H_2O$) has been known for a number of years. Many attempts have been made to place this valuable medicinal on the market in crystalline form. However, it is a fugitive compound, which is particularly sensitive to hot weather and humidity, and on standing in bottles or even in sealed glass ampoules, may spontaneously decompose from a freely soluble salt into an insoluble form. The presence of carbonates or bicarbonates also greatly accelerates conversion to an insoluble form.

For convenience of administration and to make sure of full therapeutic activity, it is customary to administer magnesium citrate in dissolved form. For this reason, ready solubility is an important factor.

When freshly prepared, the pentahydrate of dibasic acid magnesium citrate is a white, or very slightly yellowish, crystalline salt, readily soluble in five parts of water, forming a solution of pleasant acidulous flavor and approved laxative action. Unfortunately, the pentahydrate does not keep well in storage. Moreover, the stored solution, like the solid, shows a strong tendency to develop an insoluble form which soon precipitates, making the solution unsightly and commercially worthless. By the use of our preparation, however, there is no necessity for storing solutions, since we have found that dehydrated acid magnesium citrate is stable. Even after storage for long periods, it dissolves readily in cold water to form clear non-viscous solutions of concentrations as high as 20 per cent.

We have found that it is possible to stabilize the soluble dibasic acid magnesium citrate against change to an insoluble form by decreasing its water content under suitable conditions. A remarkable property of this dehydrated salt is its resistance to development of an insoluble form in the presence of carbonates and bicarbonates, as well as its stability in hot weather and under humid conditions.

Our process involves heating the pentahydrate of magnesium acid citrate to above 70° C. either at normal or subatmospheric pressures. It could not have been expected that such a process would be operative, since at the highest natural temperatures prevalent in our climate, no substantial amount of dehydration occurs, and in hot weather conversion to the insoluble form is definitely accelerated.

However, we have found that at temperatures above 70° C. dehydration begins and is accelerated at an increasing rate as the temperature rises. On the other hand, the rate of development of insolubility is not proportionately affected by these substantially higher temperatures. In consequence, at temperatures above 75° C. effective stabilization takes place before insoluble material can form.

We append a graph showing the degree of dehydration attainable at various temperatures using a constant 12-hour heating period.

The crystals used should be freshly prepared, or at any rate must be freely soluble in water, since development of the insoluble form is not reversed by dehydration. Calculating the pentahydrate as 100%, the anhydrous salt would show an assay of 142%. However, the salt becomes stable if only a minor proportion of the water of crystallization is removed. Even an assay of 104% has proven stable at elevated temperatures and humidities. It can be safely bottled and kept indefinitely.

*Example of dehydrating process.*—200 grams of the pentahydrate of magnesium acid citrate is spread out in a tray measuring 12″ x 20″. The temperature is raised to 78° C. within 2 hours and is maintained at 78° C. for 12 hours with a circulation of hot air over the surface. At the end of this time, the material assays about 112%, calculated as the pentahydrate. The material is free-flowing, opaque and crystalline, it is quickly soluble in water and can withstand long periods of hot weather and humidity without undergoing decomposition to an insoluble form. Drying temperatures below 75° C. are found to dehydrate the material too slowly for best results, but it is not advisable to heat above 135° C., since at higher temperatures there may be some discoloration of the product.

We claim:

1. As a new and useful product, stable, free-flowing, opaque, crystalline, magnesium acid citrate which contains less than five molecules of water of crystallization and which retains its solubility in water for indefinite periods of time.

2. As a new product, stable, free-flowing, opaque, crystalline magnesium acid citrate, sufficiently dehydrated to assay 110–115 per cent as the 5-water salt, which retains its solubility in about five parts of water indefinitely.

3. Process of stabilizing the water-solubility of crystalline magnesium acid citrate by dehydration at 75° to 135° C. for several hours.

4. Crystalline magnesium acid citrate, with its initial water-solubility made permanent by driving off water of crystallization at 75°–135° C. until it assays above 104% as the 5-water salt.

5. In the preparation of stable soluble magnesium acid citrate, the step of heating a crystalline, soluble preparation of the pentahydrate at 75° C. to 135° C. under pressures up to 760 mm. for about 12 hours.

JOHN L. DAVENPORT.
CHARLES F. DE COSTA.